United States Patent [19]
Scott et al.

[11] Patent Number: 5,787,363
[45] Date of Patent: Jul. 28, 1998

[54] SYSTEM AND METHOD FOR CONNECT MESSAGE SYNCHRONIZATION OF MODEMS IN A CELLULAR DATA GATEWAY

[75] Inventors: Robert Earl Scott, Indian Rocks Beach; E. Robert Lastinger, Jr., Lithia, both of Fla.

[73] Assignee: Paradyne Corporation

[21] Appl. No.: 780,238

[22] Filed: Jan. 8, 1997

Related U.S. Application Data

[60] Provisional application No. 60/026,970 Sep. 20, 1996 and 60/022,474 Jun. 21, 1996.
[51] Int. Cl.$^6$ .................................................. H01Q 7/24
[52] U.S. Cl. .................... 455/557; 458/560; 379/93.32; 375/222
[58] Field of Search ...................... 455/557, 559, 455/560, 414, 422, 426, 445, 507, 517, 403, 401; 379/93.32, 93.31, 93.33, 93.34, 93.28; 375/222, 231, 377

[56] References Cited

U.S. PATENT DOCUMENTS

| | | | |
|---|---|---|---|
| 4,837,800 | 6/1989 | Freeburg et al. | 455/557 |
| 5,249,218 | 9/1993 | Sainton | 379/93 |
| 5,570,389 | 10/1996 | Rossi | 455/557 |

*Primary Examiner*—Nguyen Vo
*Assistant Examiner*—Lester G. Kincaid
*Attorney, Agent, or Firm*—Thomas, Kayden, Horstemeyer & Risley L.L.P.

[57] ABSTRACT

A cellular data gateway situated at a mobile telecommunications switching office (MSC) is provided for interconnecting an originating mobile modem of an analog cellular system to an answer modem of a public switched telephone network (PSTN) when one of the either the cellular side or the PSTN side of the connection is capable of a fast connection sequence. The cellular data gateway comprises a quick connect cellular modem connected to the MSC and configured for interfacing with the originating mobile modem. The cellular data gateway further includes a PSTN modem connected to the MSC and configured for interfacing with the answer modem of the PSTN. The cellular modem and the PSTN modem are interconnecting in the cellular data gateway as a back-to-back modem pair. As an important part of the invention, the cellular modem includes a mechanism for delaying the initiation of a fast connect sequence with the originating mobile modem until the PSTN modem has established a connection with the answer PSTN modem. The connection of the PSTN modems is preferably signaled to the cellular modem by a carrier detect (CD) signal, that is, at the establishment of the physical layer connection. This essentially ensures that the cellular side of the connection (between the originating mobile modem) and the cellular modem and the PSTN side of the connection (between the PSTN modem and the answer PSTN modem) have substantially synchronized connect messages. Alternatively, the connection of the PSTN modems can be signaled to the cellular modem by a connect signal from the PSTN modem.

12 Claims, 5 Drawing Sheets

SYSTEM AND METHOD FOR CONNECT MESSAGE SYNCHRONIZATION OF MODEMS IN A CELLULAR DATA GATEWAY

This application claims priority to and the benefit of the filing date of commonly assigned provisional application entitled CELLULAR DATA PROTOCOL FOR QUICK CONNECTION, assigned Ser. No. 60/026,970, and filed Sep. 20, 1996; and commonly assigned provisional application entitled A RAPID START UP PROTOCOL FOR COMMUNICATION BETWEEN A PLURALITY OF MODEMS, assigned Ser. No. 60/022,474, and filed Jun. 21, 1996.

FIELD OF THE INVENTION

The present invention generally relates to data communication and, more particularly, to the synchronization of the connect messages of a cellular data communication network link and of a public switched telephone network link when a data call is routed through a cellular data gateway.

BACKGROUND OF THE INVENTION

In recent years, the popularity and growth of cellular communication has increased in dramatic fashion. One of the fastest growing parts of the cellular communication market is the transmission of data over cellular networks. The users of cellular services are more and more combining the functionality of portable data terminal equipment (DTE), e.g., a lap-top personal computer or personal digital assistant, with that cellular data communication equipment (DCE), e.g., a cellular modem coupled to a cellular phone, in order to serve both professional and personal needs.

The need for cellular data communications is driven by a number of emerging applications. The traditional e-mail type access is quickly becoming supplemented with remote LAN access to both corporate and public networks. Fax transmission has become ubiquitous and is the lowest common denominator to transmit text and images. On-line transaction services, such as credit card authorization and banking, are also emerging. Telemetry and monitoring equipment, remote meter reading and package tracking are also data applications which can be addressed by cellular technology. In the near future, video transmission over cellular networks could be provided for emergency services and newscasts. While all of these applications represent addressable applications to the marketplace, the cellular carriers are uniquely positioned to meet this need by having the ability to bundle data services with cellular voice services to offer a total mobile business solution to corporate customers.

Accordingly, the growth of the cellular data communication market is pushing data communication technology to develop features that place cellular data communications on par with land-line data communications. Present day modems are able to connect in approximately 15 seconds and transmit data at rates up to 14,400 bits per second (bps). However, it has been found that high transmit rates are possible with the use of a cellular data protocol. One example of a cellular oriented protocol is the Enhance Throughput Cellular 1™ (ETC1™) protocol developed by Paradyne Corporation, Largo, Fla., USA. To fully gain the benefits of this technology, both the cellular modem as well as the host side modem must be provisioned with the same cellular protocol. Since this is an emerging technology, the rate of advancement in technology is high, and therefore, the purchase of new modems may be required to take advantage of the latest cellular data transmission technology.

In addition to the protocol issue, corporations are limited by where they are located in the PSTN (Public Switched Telephone Network) architecture. To place a call from a cellular phone to a corporate host, the modems must pass data both over the cellular channel as well as the PSTN landline network. When this connection is established, far end echo conditions exist when viewed from the mobile modem. This condition exists on landline dial connections as well which has led to the development of advanced echo cancellation techniques to improve data performance. These echo cancellers are trained at the beginning of a dial modem session and slowly adapt to any changes observed during the duration of the call. Over landline facilities, line conditions tend to change slowly, so this technique works well. Unfortunately, for the cellular data user, cellular channel impairments change much more rapidly which sometimes causes the modems to retrain and/or downrate the speed of the connection.

A technique to improve the reliability of this type of data connection is to deploy modem pools within the cellular network as data gateways to the PSTN. By placing the modem pool at the Mobile Switching Center (MSC), the issue of echo cancellation is eliminated on the cellular link, since a full duplex, echo-free connection can be established between the mobile user and the cellular modem. In addition, these modem pools can be upgraded to support state-of-the-art cellular protocols as an enhanced data service without putting the burden on the corporate host, thereby lowering costs. An additional benefit gained by provisioning modems within the cellular network is that modem transmit levels can be set to optimize performance over the cellular channels since all calls coming into the modem pool are known to be cellular calls. One such modem pool product is Paradyne Corporation's Wireless Data Gateway™ (WDG). A typical application of this "cellular modem pool" concept is the *DATA enhanced circuit switched data service. In this application, modems are connected in a back-to-back modem pair arrangement to provide the benefits of the enhanced cellular data connection with the ubiquity of high speed dial access. This service incorporates the *DATA prefix to the destination dial phone number to indicate to the cellular network switch at the MSC that the call requires special routing and to pass the call through the cellular modem pool. At the modem pool, the cellular protocol link is terminated at an MSC(cellular) modem of the modem pool and a separate but dependent PSTN link is established with a MSC(PSTN) modem of the modem pool. This allows for optimization of the cellular link protocol and the PSTN link protocol, and thereby, provides increased reliability and performance over the mixed cellular and PSTN facilities.

With this architecture, in most cases, cellular service providers can provision a 14.4 kbps data service over the existing analog cellular networks. Since this is the raw data rate, standard compression schemes such as V.42bis, could drive effective data throughput as high as 57.6 kbps.

An important feature to the operation of a modem pool is the synchronization of connection of the cellular link and the PSTN link, that is, the synchronization of the connection sequence of the cellular modem and the PSTN modem. For purposes of this discussion, a connect sequence includes automoding and training. If the modems are not synchronized, problems can occur with user applications that may expect to send or receive data immediately after a connection is established. For example, many applications will send a message immediately upon connection. Some of these applications expect a fast response from the remote side, or they will disconnect. Typically, as long as this response is within 5 seconds, no disconnect will occur.

The synchronization of the cellular side and the PSTN side of the connection is presently accomplished by starting the connect sequence of the modems at substantially the same time. Since the connect sequence takes approximately the same amount of time, this approach has worked. Examples of such methods for synchronization are Paradyne Corporation's Audio Passthrough method as well as the Answer Holdoff method provided by other manufacturers. The Audio Passthrough method of Paradyne Corporation allows the answer tone of the PSTN answer modem to break the audio passthrough connection and simultaneously start training both sides of the connection. As long as both the cellular link and PSTN link trained up in about the same time, this method works well. The Answer Holdoff method prevents the cellular modems from training until after the far end PSTN modem has answered. It does this by monitoring bits in the sequence of its T1 connection. Again, as long as the cellular link and the PSTN link trained up in about the same time, this method also works well.

However, the ability to provide faster connections and faster data rates is of particular concern since the cellular customer typically pays a charge for each cellular call based primarily on the length of the call, among several other factors such as day of the week, time of day, roaming, etc. Consequently, a new breed of fast connect modems are being developed that essentially reduce the time of a connect sequence to less than 5 seconds. This is a substantial improvement over current connection times, such as with a International Telecommunications Union (ITU) (CCITT) Standard V.34 connection where the automoding and training takes between 10–15 seconds. Accordingly, a fast connect modem can be considered a modem that automodes and trains substantially faster than a standard modem, preferably in less than 5 seconds. An example of one such fast connect modem is the Enhanced Throughput Cellular 2 Quick Connect™ (ETC2-QC™) of Paradyne Corporation. For a back-to-back modem pair in the modem pool, it is likely that a fast connecting cellular protocol (ETC2-QC™ or others) will allow the cellular side to connect faster than the PSTN side in many cases. This can cause problems with some applications that expect to send or receive data immediately after establishing a connection.

Therefore, a heretofore unaddressed need exists in the industry for a system and method for synchronizing the connection of the cellular side and PSTN side of a data call through a cellular data gateway when the cellular link is capable of a fast connect sequence.

SUMMARY OF THE INVENTION

The present invention overcomes the inadequacies and deficiencies of the prior art as discussed hereinbefore and as well known in the industry. The present invention provides for a cellular data gateway situated at a Mobile Switching Center (MSC) for interconnecting an originating cellular modem of an analog cellular system to an answer modem of a public switched telephone network (PSTN) when the cellular side of the connection is capable of a fast connection sequence. In architecture, the cellular data gateway comprises an MSC(cellular) modem connected to the MSC and configured for interfacing with the originating cellular modem. For purposes of this disclosure, it is assumed that at least the originating cellular modem and the MSC(cellular) modem are capable of performing a fast connection sequence which essentially that the two modems can automode and train in less than approximately 5 seconds. The cellular data gateway further includes a MSC(PSTN) modem connected to the MSC and configured for interfacing with the answer modem of the PSTN.

The MSC(cellular) modem and the MSC(PSTN) modem are interconnecting in the cellular data gateway as a back-to-back modem pair. As an important part of the present invention, the MSC(cellular) modem includes means for delaying the initiation of a fast connect sequence with the originating cellular modem until the MSC(PSTN) modem has established a connection with the answer PSTN modem. The connection of the PSTN modems, that is, the establishment of the physical layer connection, is preferably signaled to the MSC(cellular) modem by a carrier detect (CD) signal. This essentially ensures that the cellular side of the connection (between the originating cellular modem and the MSC (cellular) modem) and the PSTN side of the connection (between the MSC(PSTN) modem and the answer PSTN modem) have substantially synchronized connect messages. Therefore, from the time when the MSC(cellular) modem receives indication of the PSTN side CD signal, the cellular side is able to automode, train and perform error control negotiation in 3–4 seconds. Meanwhile, the PSTN modems are performing their own error control negotiation which may take from 2–4 seconds depending on the protocol standard utilized. Thus, the cellular side of the connection and the PSTN side of the connection establish a connection within about 5 seconds of one another.

Alternatively, the connection of the PSTN modems can be signaled to the MSC(cellular) modem by a connect signal from the PSTN modem. In this embodiment, the connection of the cellular side will always be after the connection of the PSTN side since the cellular side automodes, trains and performs error control negotiation after the PSTN side has already connected. However, the fast connection sequence and efficient error control negotiation by the cellular modems enable the cellular side to connect within 5 seconds of the PSTN side.

A method for connect message synchronization in a data gateway situated at a MSC and configured for interconnecting an originating cellular modem and an answer PSTN modem, wherein the data gateway includes a modem pool having an MSC(cellular) modem and an MSC(PSTN) modem connected in a back-to-back configuration, can be generalized as follows. Initially, the MSC(cellular) modem of the cellular data gateway receives a call initiate message from the originating cellular modem. Next, the MSC (cellular) modem determines if the originating cellular modem is capable of a fast connect sequence, and if it is, then the MSC(cellular) modem initiates a fast connect sequence between the originating cellular modem and itself after the answer modem of the PSTN and the MSC(PSTN) modem of the cellular data gateway have completed a connection. If the originating cellular modem is not capable of a fast connect sequence, then the MSC(cellular) modem initiates a standard connect sequence between said originating cellular modem and said MSC(cellular) modem. Once both the cellular side and the PSTN side of the connection have established a connection, they can begin to transmit customer data.

A feature of the present invention is its ability to synchronize the connect messages if the PSTN side of the connection is capable of a fast connect sequence. In this case, the PSTN side would notify the cellular modem once it has connected so as to trigger the fast connect sequence of the cellular side. If the PSTN side only takes 2–3 seconds to connect, then the cellular side will be connected within a couple of seconds of the PSTN side.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The present invention can be better understood with reference to the following drawings. The elements of the drawings are not necessarily to scale, emphasis instead being placed upon clearly illustrating the principles of the present invention. Furthermore, like referenced numerals designate corresponding parts throughout the several views.

DETAILED DESCRIPTION OF THE PREFERRED EMBODIMENT

The following description is of the best presently contemplated mode of carrying out the present invention. This description is not to be taken in a limiting sense, but is made merely for the purpose of describing the general principles of the invention. Consequently, the scope of the invention should be determined by referencing the appended claims.

I. Architecture

Figure 1:
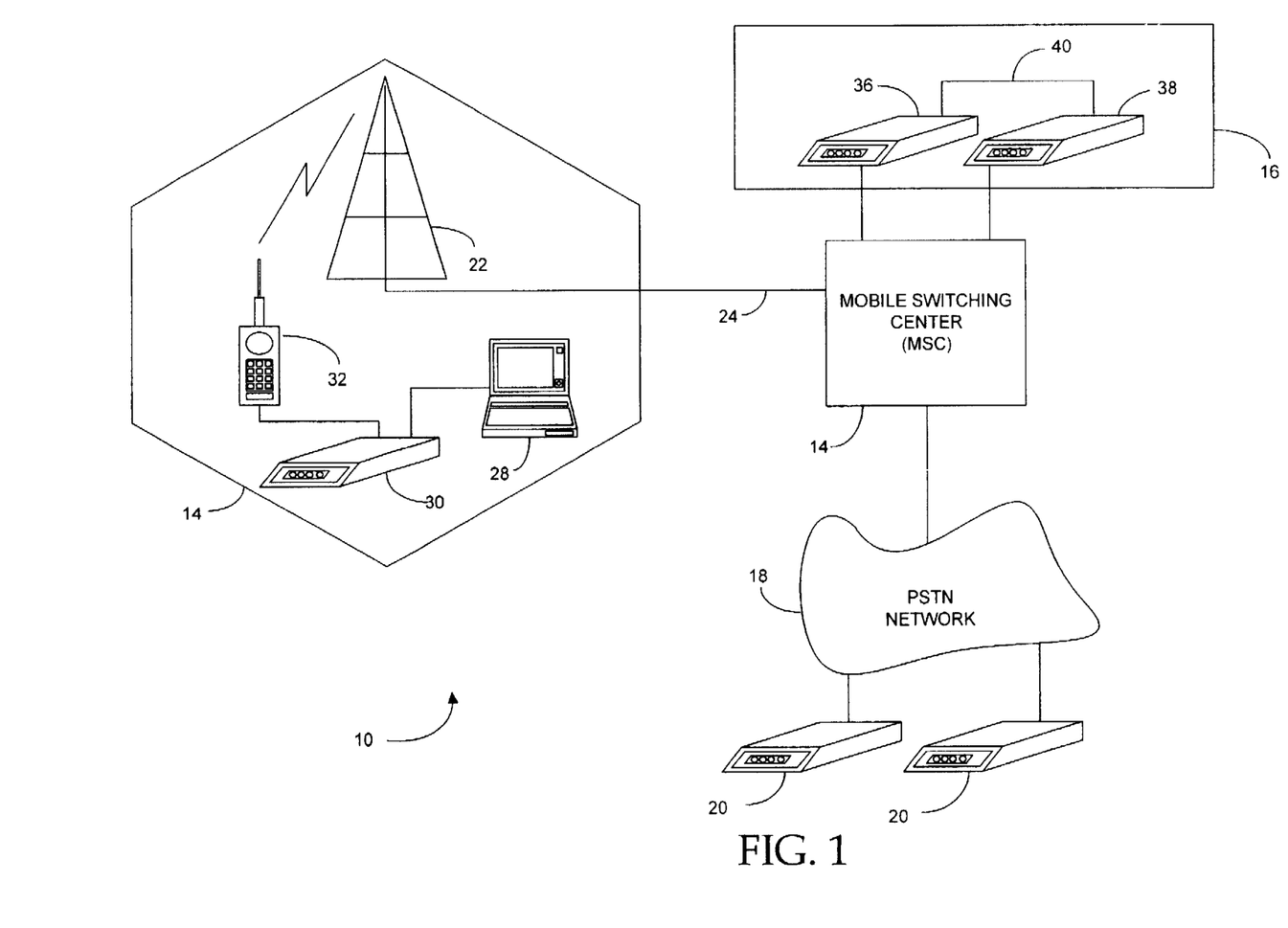
FIG. 1 is a high level diagram of a cellular data communication network.

With reference to the drawings, FIG. 1 shows a cellular data communication network 10 suitable for employing the present invention. The cellular communication network 10 includes a plurality of cells 12 (only one of which is shown for purposes of simplifying the figure), a Mobile Switching Center (MSC) 14, a cellular data gateway 16 connected to the MSC 14, a public switch telephone network (PSTN) 18, and one or more standard PSTN modems 20 connected to the PSTN 18.

The cell 12 includes a cellular antenna 22 and a base radio (not shown) as is well known in the industry for implementation of a cell site. The cellular antenna and base station are connected to the MSC 14 via a carrier facility 24, such as a T1 trunk. Within the cell 12 is a piece of data terminal equipment (DTE), such as a lap-top personal computer 28, that is interfaced with a mobile modem 30 for modulating and demodulating data that is transmitted and received, respectively, over the cellular data communication network 10 via a cellular phone 32.

The MSC 14 interconnects the cellular data communication network 10 to the PSTN 18. The PSTN 18 provides a connection to a far-end standard PSTN modem 20 that can be further connected to data terminal equipment such as a personal computer or server (neither of which are shown). The MSC 14 typically includes a cellular network switch for routing calls and a base station controller for performing mobility management functions, such as channel routing functions and hand-off functions. The operation of the cellular network switch and the base station controller are well known in the industry, and since they do not constitute any part of the present invention, they are not discussed in detail herein.

The cellular data gateway 16 comprises a fast connect MSC(cellular) modem 36 and an MSC(PSTN) modem 38 connected as a back-to-back modem pair via a connection 40. As discussed above in the Background section, the cellular data gateway 16 terminates the cellular protocol transmission at the fast connect MSC(cellular) modem 36 and establishes as a separate, but dependent, PSTN connection to the answer PSTN modem 20, thereby dividing a data call into a cellular side and a PSTN side. This approach allows for sophisticated modulation and error correction techniques to be applied separately to the cellular side of the call, and to address the unique signal impairment characteristics of each side of the call separately. This results in optimum speed and through-put on an end-to-end basis. These cellular modem pools are well known in the industry and are made by several manufacturers. Typically, a *DATA prefix is added to the dial phone number of the answer PSTN modem in order to indicate to the MSC 14 that the call requires special routing through the data gateway and, more particularly, is to be routed to the MSC(cellular) modem 36. The dial connection is bridged to the MSC(PSTN) modem 38 via connection 40 so that call progress tones are made available to the far-end cellular modem.

Figure 2:
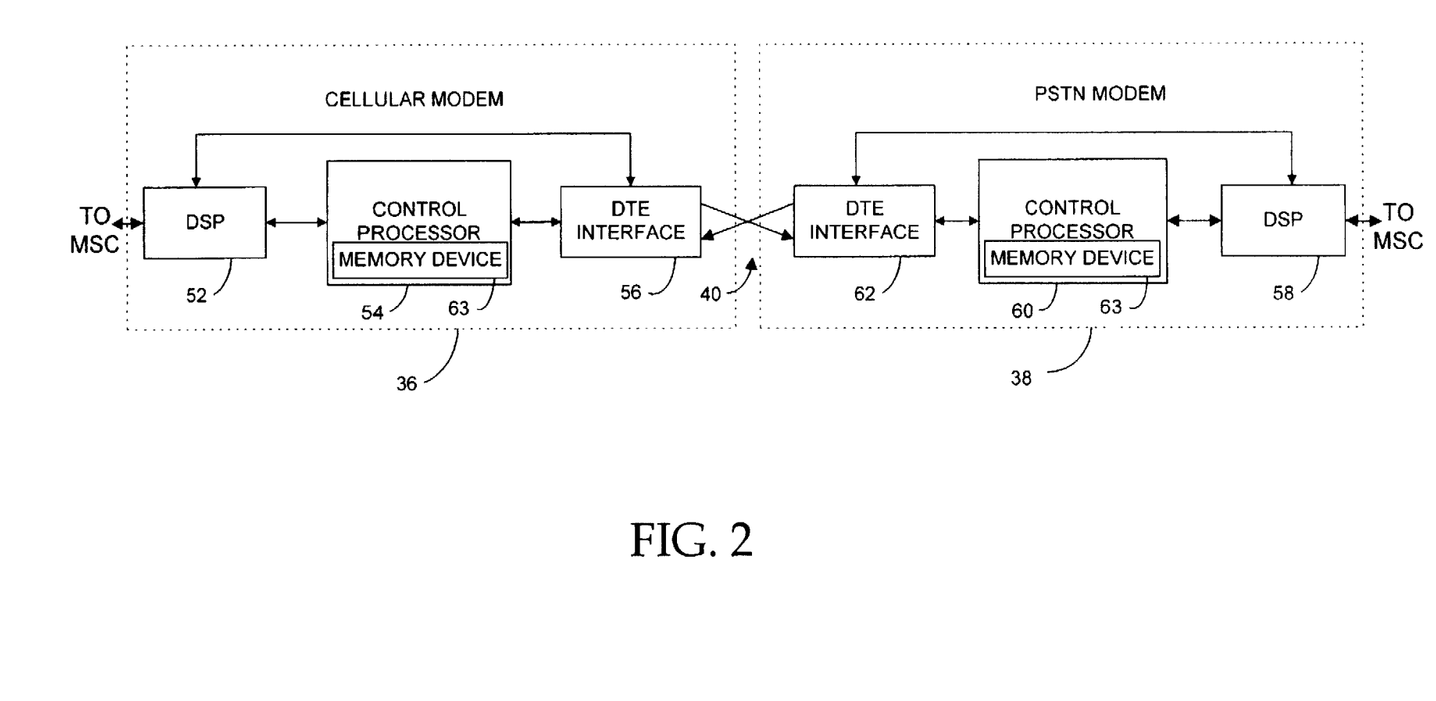
FIG. 2 is a block diagram of the modems that comprise a back-to-back modem pair in a data gateway for the cellular data communication network of FIG. 1.

With reference to FIG. 2, illustrated are the MSC(cellular) modem 36 and the MSC(PSTN) modem 38 that comprise the cellular data gateway 16. The MSC(cellular) modem 36 is a quick connect modem capable of performing a fast connect sequence with a quick connect originating cellular modem, as discussed below. The MSC(cellular) modem 36 comprises a digital signal processor (DSP) 52, a control processor 54, and a DTE interface 56. Likewise, the MSC (PSTN) modem 38 comprises a DSP 58, a control processor 60, and a DTE interface 62. The DTE interface 56 of the MSC(cellular) modem 36 interfaces with the DTE interface 62 of the MSC(PSTN) modem 38 via the connection 40 that can be implemented by any suitable interconnecting device such as, but not limited to, an Electronic Industry Association EIA) standard RS-232 cross-over or a backplane bus between the modems 36, 38. As shown in FIG. 2, each modem 36, 38 is configured essentially the same, and thus, they operate in essentially the same manner. However, each modem is provided with operating code that is stored in a memory device 63, 63' provided with the control processor 54, 60, respectively, or alternatively, in additional memory that may be provided and connected to the central processor 54, 60, if desired. In the context of the present disclosure, a memory device is a computer readable medium that is embodied in an electronic, magnetic, optical, or other physical device or means that can contain or store a computer program, such as the operating code for modem 36, 38, for use by or in connection with a computer related system or method. The operating code includes control logic that controls, among other things, the type of modulation and error correction techniques utilized which is dependent upon whether the modem is used for cellular or land-line connections. Accordingly, the central processor 54, 60 operates on, or executes, the operating code in memory device 63, 63', that is configured for implementing the present invention so as to control the operation of modem 36, 38.

For purposes of illustrating the present invention, it is assume that cellular modem 30 is capable of performing a fast connect sequence with the fast connect MSC(cellular) modem 36. That is, both the cellular modem 30 and MSC (cellular) modem 36 can perform automode and training in less than approximately 5 seconds. Accordingly, as discussed above in the Background section, if a data call were to originate at the lap-top 28 and be sent to an answer PSTN modem 20 through to the data gateway 16, then the cellular side of the connection will connect substantially faster than the PSTN side, assuming that the PSTN side is utilizing one of the International Telecommunications Union (ITU) (CCITT) modulation standards such as V.32bis or V.34. However, if the time to connection between the two sides of the call differ by greater than approximately 5 seconds, then the connections are not considered synchronized and the probability of a system level problem increases. For example, if an application running on lap-top 28 expects to receive a carriage return immediately upon originating cellular modem 30 receiving a connect message, then the application may time-out and abort the calling process while the PSTN side of the call is still completing its connection sequence.

Having a sophisticated knowledge of fast connect modems and cellular data gateways, the present inventor has identified this problem and provides the present invention as a reliable and cost-effective solution. Particularly, the synchronization problem described above with reference to the cellular data communication network 10 can be avoided by delaying the connect sequence between the cellular modem 30 and the MSC(cellular) modem 36 on the cellular side of the connection. A preferred embodiment for implementing the present invention is to impose a delay in the response of the cellular modem to the originating mobile modem that starts the fast connect sequence until the cellular modem 36 receives a carrier detect signal from the MSC(PSTN) modem 38 via connection 40. This preferred embodiment is discussed below with reference to FIG. 3A. An alternative embodiment includes delaying the automode and training functions of the cellular link until the MSC(cellular) modem 36 receives a connect message signal from the MSC(PSTN) modem 38 via connection 40. This embodiment is discussed below with reference to FIG. 3B.

Figure 3A:
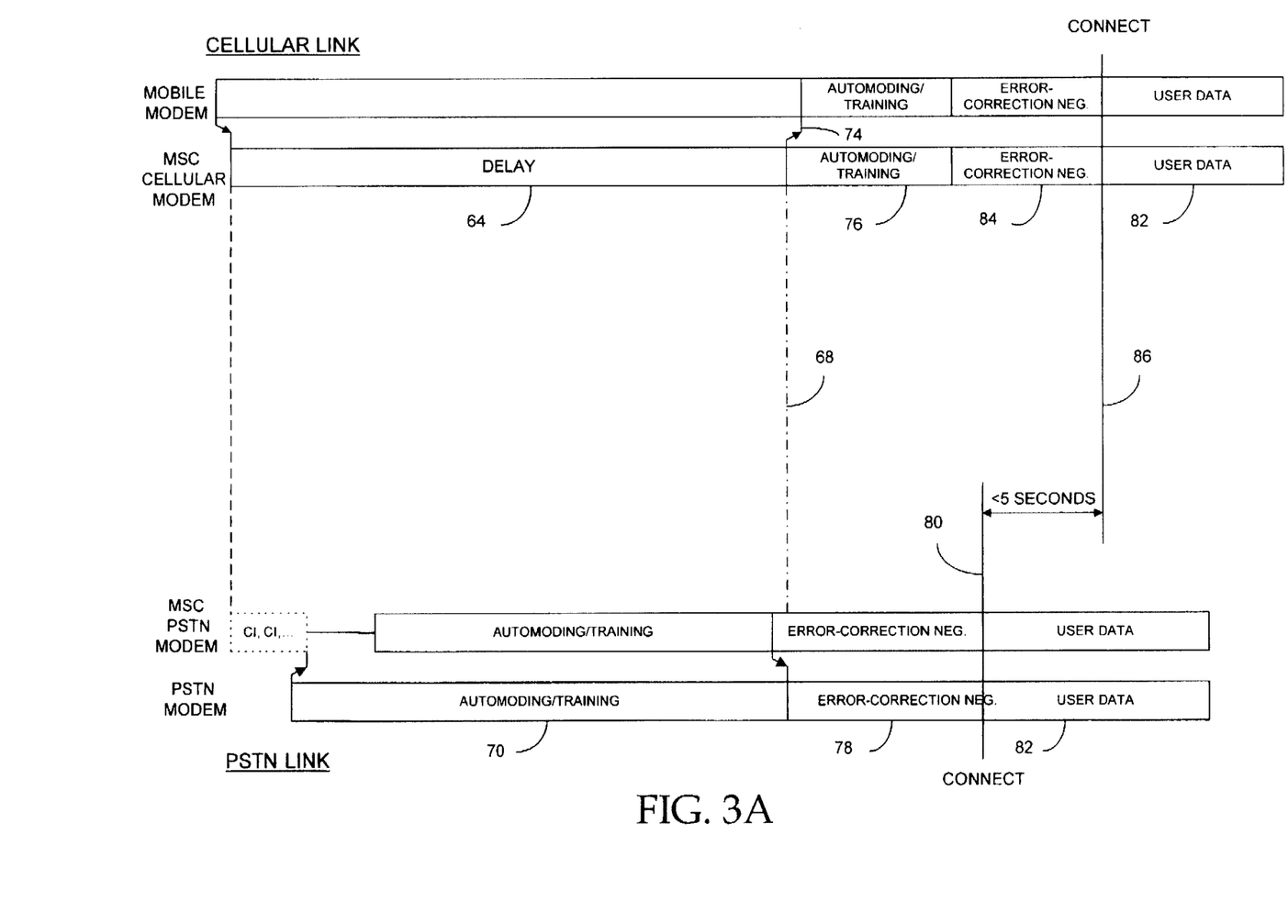
FIG. 3A is a schematic diagram of the connect sequences of the cellular and PSTN links that employs a preferred embodiment of the present invention.

An implementation of the preferred embodiment is provided in FIG. 3A. The connect sequences for the cellular side and the PSTN side of the connection are illustrated in relation to one another. In this example of the preferred embodiment, the MSC(cellular) modem 36 incorporates a delay 64 into its response to the originating cellular modem 30 for initiating the automode and training (i.e., fast connect) sequence 76 until the MSC(cellular) modem 36 receives a carrier detect signal 68 from the MSC(PSTN) modem 38 via connection 40. It is noted that the carrier detect signal 68 is also referred to as a line signal detect (LSD), or a "109" signal in the ITU (CCITT) V.34 modulation standard.

In general, the cellular modem 30 initiates a data call over the cellular data communication network 10 utilizing an identifier prefix so that the MSC 14 recognizes the call as a data call and routes it to the data gateway 16. For purposes of disclosing the present invention, it is assumed that the originating cellular modem 30 is a fast connect modem and that the calling indicator (CI) signal sent from the cellular modem 30 to the MSC(cellular) modem 36 identifies the cellular modem 30 as such. If the originating cellular modem is not a fast connect modem, then both sides of the connection automode and train in substantially the same amount of time so they can synchronize their connect messages by synchronizing the beginning of their connect sequence with the Audio Passthrough method or Answer Hold-off method described above. Once the MSC(cellular) modem 36 identifies the originating cellular modem as a fast connect modem, it knows that the cellular side of the connection can automode and train in approximately 2-3 seconds. Therefore, in accordance with the present invention, the MSC(cellular) modem 36 delays its answer to the cellular modem 30 so the automode and training sequences do not begin until the MSC(cellular) modem 36 receives a carrier detect signal 68 from the MSC(PSTN) modem 38 via connection 40.

During the delay 64, the dial connection for the call is bridged to the PSTN link so that the MSC(PSTN) modem 38 and the answer PSTN modem 20 at the destination dial phone number can begin their automode and training sequence. As an example, in the ITU (CCITT) V.34 modulation standard, the MSC(PSTN) modem 38 sends out CI pulses until an answer tone is received from the answer PSTN modem 20 at which time automode and training begins as indicated by reference numeral 70. It is noted at this point that the automode and training sequence 70 of the PSTN link takes about 10 seconds in the ITU (CCITT) V.32bis modulation standard. For a modem operating with the ITU (CCITT) V.34 modulation standard, the connection sequence can take as long as 15 seconds. Upon completion of the automode and training sequence 70, the PSTN link has established a physical layer connection and a carrier detect signal 68 (ie., a "109" signal) is sent from the MSC(PSTN) modem 38 to the MSC(cellular) modem 36 via connection 40. The MSC(PSTN) modem 38 and the answer PSTN modem 20 then begin establishing a link layer connection by first performing error control, as indicated by reference numeral 78. This typically involves error control negotiation as defined in ITU (CCITT) V.42 protocol standard. This may take anywhere from 1 to 2 seconds. Alternatively, error control can be performed via Microcom Networking Protocol (MNP) protocol standard which can take up to 6 seconds. If the standard PSTN modem 20 is not configured for performing error control, then no error control is performed at this point. At the end of error control negotiations 78, the MSC(PSTN) modem 38 and the standard PSTN modem 20 are connected and a connect message 80 is generated and the PSTN modems are ready to begin transmitting customer data 82.

In response to receiving a carrier detect signal 68, the MSC(cellular) modem 36 sends an answer message 74 to the cellular modem 30 to initiate a fast connect sequence 76, followed by error control negotiation 84 and resulting in a connect message 86. This is performed substantially simultaneously with the PSTN side modem's error control negotiation 78. Since the PSTN modems take anywhere from 1 to 6 seconds to perform error control negotiation and the cellular modems perform a fast connect sequence in less than 5 seconds, the PSTN and cellular links connect within a few seconds of one another, at least within approximately 5 seconds of each other. Therefore, the connect messages 80, 86 are substantially synchronized so as not to cause problems between applications at either end of the connection. This is clearly illustrated in FIG. 3A wherein the cellular link establishes a connection slightly after the PSTN link establishes a connection. However, it should be recognized that the cellular link may even be able to establish a connection prior to the PSTN link depending upon the error control negotiations 78, 84 performed between the PSTN modems and the cellular modems, respectively.

Figure 3B:
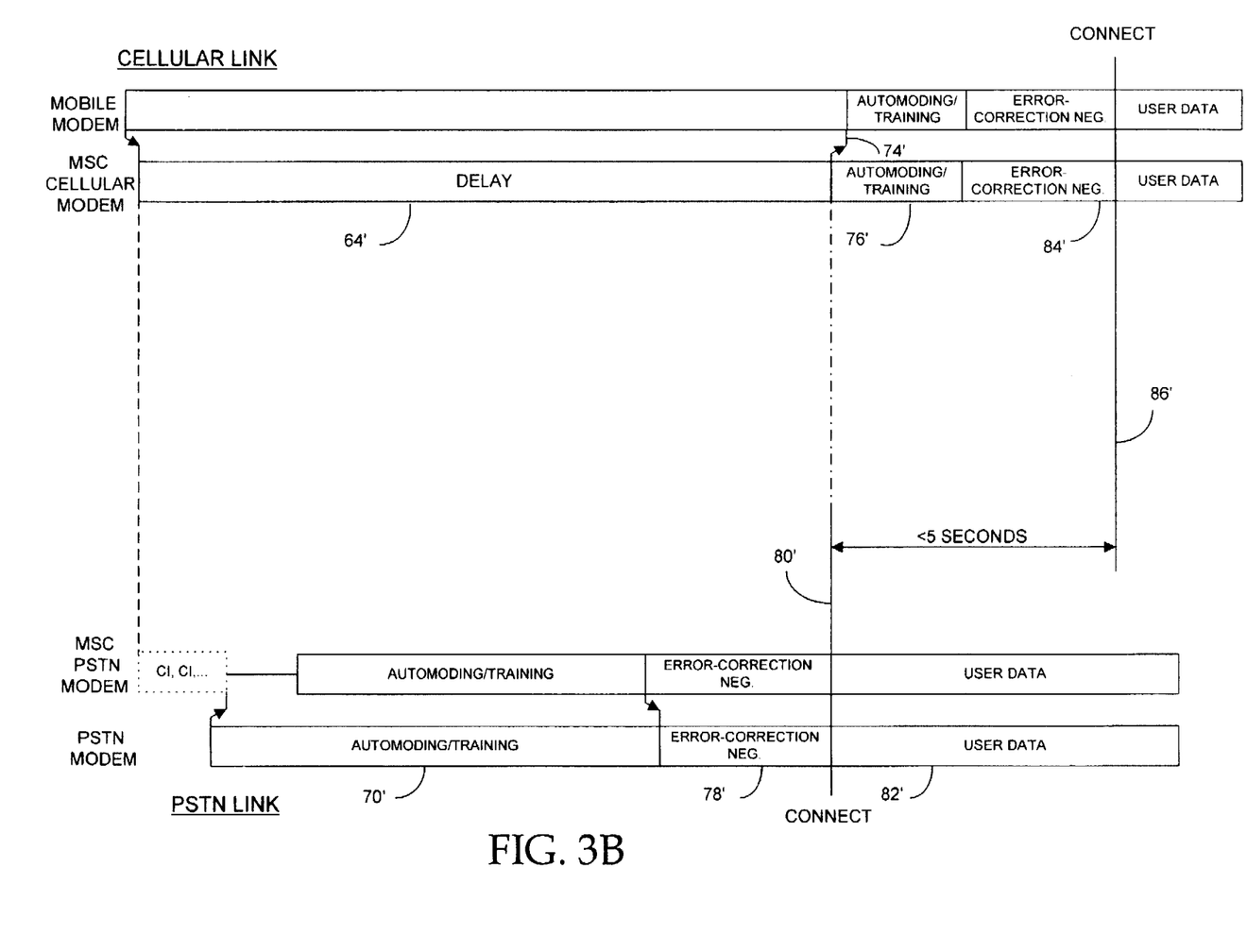
FIG. 3B is a schematic diagram of the connect sequences of the cellular and PSTN links that employs an alternative embodiment of the present invention.

With reference to FIG. 3B, an alternative embodiment is illustrated whereby the MSC(cellular) modem 36 imposes a delay 64' in its response 74' to the originating cellular modem 38 until the PSTN link has generated a connect message 80'. In this configuration, the connection of the PSTN link will always take place before the connection of the cellular link since it is the triggering event that begin the automode and training sequence 76' of the cellular link. However, because of the cellular modems are capable of performing a fast connect sequence, the cellular link is able to connect in less than 5 seconds of when the PSTN link connects, as shown in FIG. 3B. Thus, the connections 80'0 and 86'0 are substantially sychronized.

II. Operation

Figure 4:
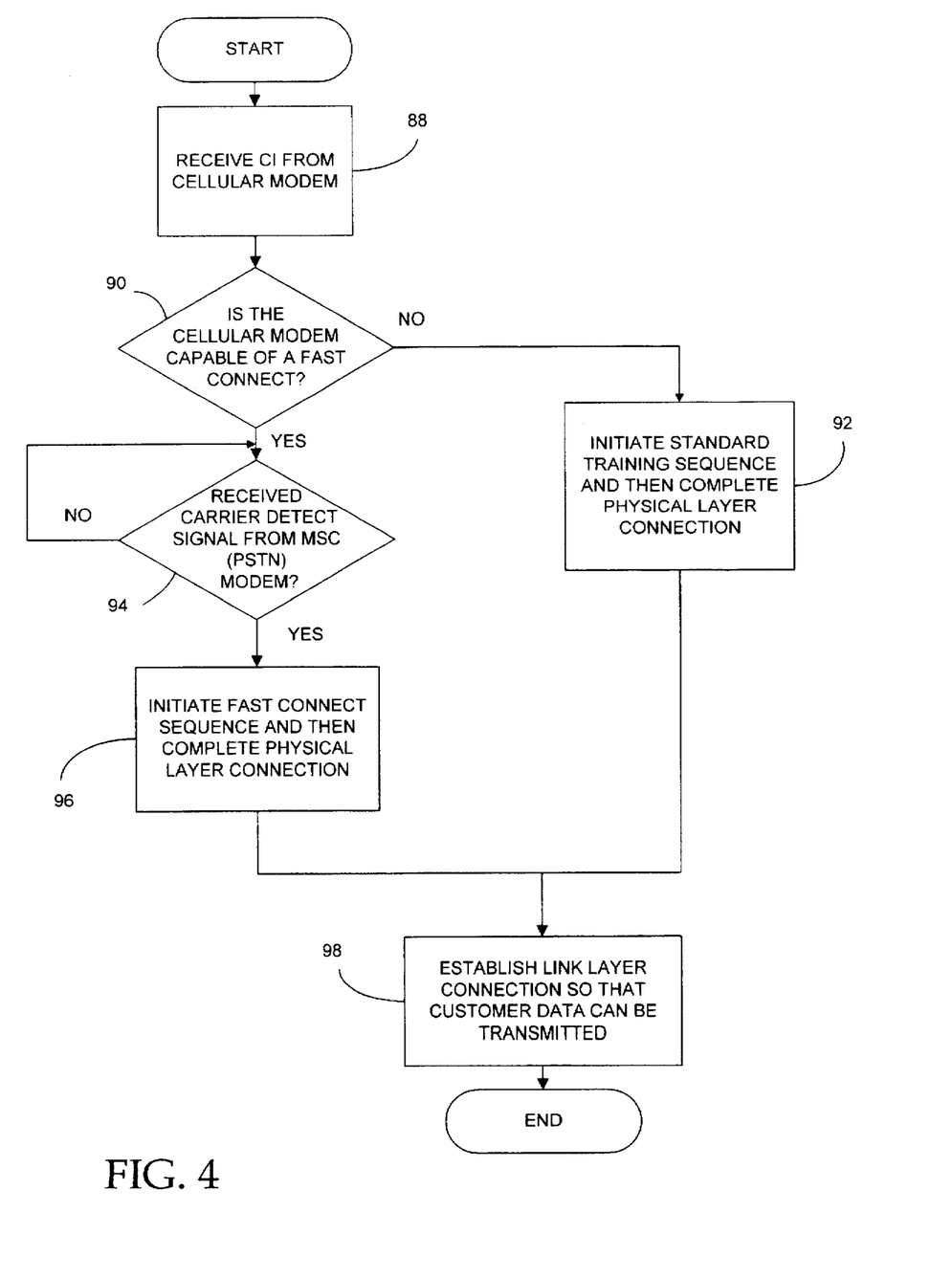
FIG. 4 is a flowchart of an illustrative method for synchronizing the cellular side and PSTN side in accordance with the principles of the present invention.

The present invention also provides for a method of synchronizing the connect messages of the cellular and PSTN links. This method is illustrated in FIG. 4 and can be generalized as follows with regard to the operation of the MSC(cellular) modem 36.

Initially, MSC(cellular) modem 36 receives a CI signal from the originating cellular modem 30, as indicated by block 88. At block 90, the MSC(cellular) modem 36 determines whether the cellular modem 30 is capable of performing a fast connect sequence. If the cellular modem 30 is not capable of a fast connect sequence, then the MSC(cellular) modem 36 synchronizes its connect message with that of the PSTN link via the Audio Passthrough method or the Answer Hold-off method, as indicated by block 92. If the cellular modem 30 is capable of a fast connect sequence, then the MSC(cellular) modem 36 delays its response to the cellular modem 30 until it receives a carrier detect signal from the MSC(PSTN) modem 38, as indicated by block 94. Upon receiving the carrier detect signal from the MSC(PSTN) modem 38, the MSC(cellular) modem 36 initiates a fast connect sequence in order to establish the physical layer connection, as indicated by block 96. Thus, the connection of the cellular link is substantially synchronized with the connection of the PSTN link such that the connections are made within approximately 5 seconds of one another. As mentioned above, the delayed performed by block 94 can alternatively be triggered by receipt of a connect message from the MSC(PSTN) modem 38.

Upon establishing the physical layer connection of the cellular link at either block 92 or 96, the link layer connection is established so that customer data can be transmitted from end-to-end, as indicated by block 98.

In concluding the detailed description, it should be noted that it will be obvious to those skilled in the art that many variations and modifications may be made to the preferred embodiment without substantially departing from the principles of the invention. All such variations and modifications are intended to be included herein within the scope of the present invention, as set forth in the following claims. Further, in the claims hereafter, the corresponding structures, materials, acts, equivalent of all means or step plus function elements are intended to include any structures, materials, or acts for performing the recited functions in combination with other claimed elements as specifically claimed.

Wherefore, the following is claimed:

1. A data gateway for a wireless network situated at a mobile switching center for interconnecting an originating modem of an analog cellular system and an answer modem of a public switched telephone network (PSTN), said data gateway comprising:

a cellular modem connected to a cellular switch and configured for interfacing with said analog cellular system, said cellular modem capable of operating in a fast connect sequence;

a PSTN modem connected to said mobile switching center and configured for interfacing with said PSTN;

means for interconnecting said cellular modem and said PSTN modem as a back-to-back modem pair so as to form a data gateway; and delay means associated with said cellular modem of said data gateway for delaying said cellular modem of said data gateway from initiating said fast connect sequence with said originating cellular modem until said PSTN modem of said data gateway has completed making a connection with the answer PSTN modem.

2. The data gateway of claim 1, wherein said delay means includes detection means associated with said cellular modem of said data gateway for detecting a carrier detect signal from said PSTN modem of said data gateway via said interconnecting means.

3. The data gateway of claim 1, wherein said delay means includes detection means associated with said cellular modem of said data gateway for detecting a connect signal from said PSTN modem of said data gateway via said interconnecting means.

4. The data gateway of claim 1, wherein said means for interconnecting includes a crossover bus interconnecting a first data terminal interface associated with said cellular modem of said data gateway and a second data terminal interface associated with said PSTN modem of said data gateway.

5. The data gateway of claim 1, wherein said fast connect sequence includes negotiation of a physical layer and an error control layer connection.

6. The data gateway of claim 5, wherein said physical layer and error control layer connection is negotiated in less than three seconds.

7. A method for synchronizing connect messages in a data gateway for a wireless network that is situated at a mobile switching center and configured for interconnecting an originating modem of an analog cellular system and an answer modem of a public switched telephone network (PSTN), wherein said data gateway includes a cellular modem and a PSTN modem connected in a back-to-back configuration, said method comprising the steps of:

receiving at said cellular modem of said data gateway a call initiate message from said originating modem of said analog cellular system;

determining if said originating modem is capable of a fast connect sequence:

if said originating modem is not capable of a fast connect sequence, initiating a standard connect sequence between said originating modem and said cellular modem;

if said originating modem is capable of a fast connect sequence, initiating a fast connect sequence between said originating modem and said cellular modem after said answer modem and said PSTN modem have completed a connection; and transmitting customer data.

8. The method of claim 7, wherein said step of determining if said originating modem is capable of said fast connect sequence includes the steps of identifying and selecting a common mode of operation between said originating modem and said cellular modem.

9. The method of claim 7, wherein said step of initiating said fast connect sequence includes the steps of detecting at said cellular modem a carrier detect signal from said PSTN modem.

10. The method of claim 7, wherein said step of initiating said fast connect sequence includes the steps of detecting at said cellular modem a connect signal from said PSTN modem.

11. The method of claim 7, wherein said wherein said fast connect sequence is performed in less than three seconds.

12. A computer program product having a computer readable medium including computer program logic recorded thereon for synchronizing connect messages in a data gateway for a wireless network that is situated at a mobile switching center and configured for interconnecting an originating modem of an analog cellular system and an answer modem of a public switched telephone network (PSTN), wherein said data gateway includes a cellular modem and a PSTN modem connected in a back-to-back configuration, comprising:

receiving at said cellular modem of said data gateway a call initiate message from said originating modem of said analog cellular system;

logic for determining if said originating modem is capable of a fast connect sequence:

logic for initiating a standard connect sequence between said originating modem and said cellular modem, if said originating modem is not capable of a fast connect sequence;

logic for initiating a fast connect sequence between said originating modem and said cellular modem after said answer modem and said PSTN modem have completed a connection, if said originating modem is capable of a fast connect sequence; and     transmitting customer data.

\* \* \* \* \*

UNITED STATES PATENT AND TRADEMARK OFFICE
CERTIFICATE OF CORRECTION

PATENT NO. : 5,787,363
DATED : Jul. 28, 1998
INVENTOR(S) : Scott et al.

It is certified that error appears in the above-identified patent and that said Letters Patent is hereby corrected as shown below:

On the title page, item [57],

In The Abstract:

First sentence, after "(PSTN) when one of", delete "the".

In The Drawings:

FIG. 1, at the left side of the figure, delete "14" and insert --12--.

FIG. 2, at the right side of the figure, delete "63" and insert --63'--.

FIG. 3, at each occurrence, delete "ERROR-CORRECTION NEG." and insert --ERROR-CONTROL NEG.--.

FIG. 4, at each occurrence, delete "ERROR-CORRECTION NEG." and insert --ERROR-CONTROL NEG.--.

Column 3, line 67, after "essentially", insert --means--.

Column 9, line 9, delete "80'0", and insert --80'--.

Column 9, line 10, delete "86'0", and insert --86'--.

In The Claims:

Column 11, line 1, after "claim 7,", delete "wherein said".

Signed and Sealed this

Twenty-ninth Day of December, 1998

Attest:

BRUCE LEHMAN

*Attesting Officer*     *Commissioner of Patents and Trademarks*